J. G. BALSILLIE.
MEANS AND APPARATUS FOR DEPOSITING AND COLLECTING AQUEOUS PARTICLES FROM THE ATMOSPHERE AND COLLECTING RAIN AND DEW.
APPLICATION FILED DEC. 23, 1916.

1,284,042.

Patented Nov. 5, 1918.
2 SHEETS—SHEET 1.

J. G. Balsillie
Inventor

J. G. BALSILLIE.
MEANS AND APPARATUS FOR DEPOSITING AND COLLECTING AQUEOUS PARTICLES FROM THE ATMOSPHERE AND COLLECTING RAIN AND DEW.
APPLICATION FILED DEC. 23, 1916.
1,284,042.
Patented Nov. 5, 1918.
2 SHEETS—SHEET 2.
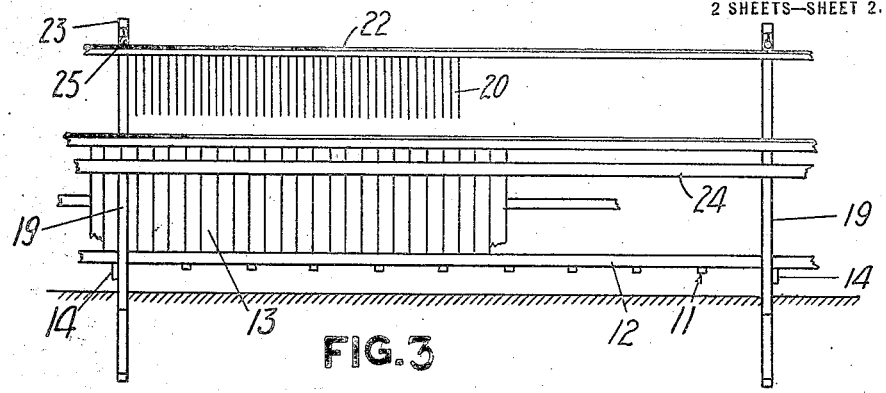
FIG. 3
FIG. 4
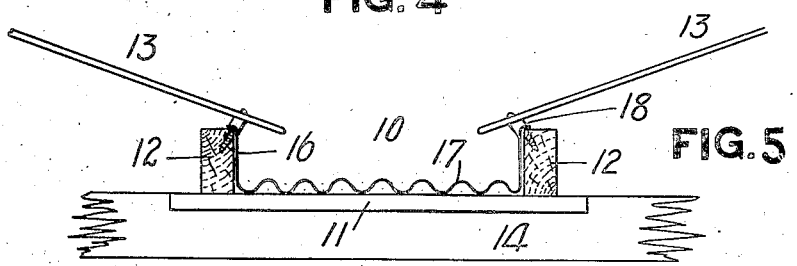
FIG. 5
FIG. 6
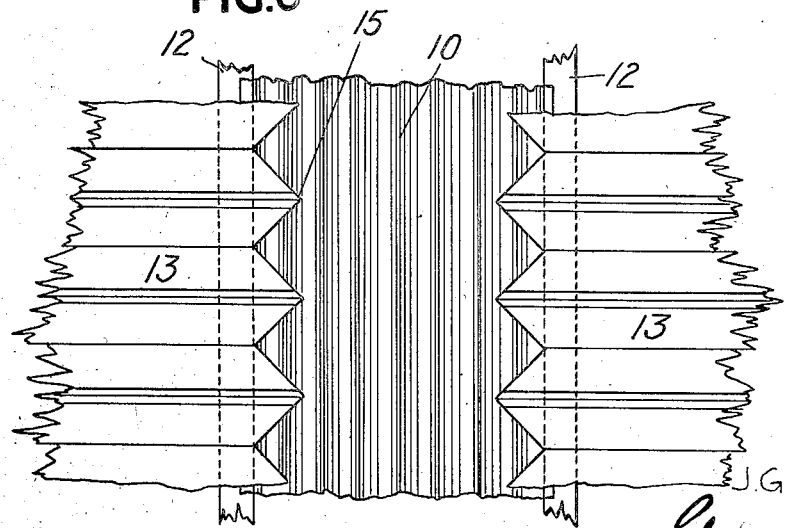
J. G. Balsillie
Inventor
By
Attorney.

UNITED STATES PATENT OFFICE.

JOHN GRAEME BALSILLIE, OF MELBOURNE, VICTORIA, AUSTRALIA.

MEANS AND APPARATUS FOR DEPOSITING AND COLLECTING AQUEOUS PARTICLES FROM THE ATMOSPHERE AND COLLECTING RAIN AND DEW.

1,284,042.   Specification of Letters Patent.   Patented Nov. 5, 1918.

Application filed December 23, 1916. Serial No. 138,667.

*To all whom it may concern:*

Be it known that I, JOHN GRAEME BALSILLIE, subject of the King of Great Britain and Ireland, residing at 360 Collins street, Melbourne, Victoria, Australia, have invented new and useful Improvements in Means and Apparatus for Depositing and Collecting Aqueous Particles from the Atmosphere and Collecting Rain and Dew, of which the following is a specification.

This invention relates to means and apparatus for collecting rainfall, dew and aqueous particles from the atmosphere; operating as a natural catchment when collecting rainfall, operating as a thermal catchment when collecting dew, and when collecting aqueous particles from the atmosphere operating in conjunction with electrical means to occasion coalescence of said particles and their deposit into said catchment.

Dew is aqueous vapor which is condensed from the atmosphere on bodies, during the night, in the form of minute globules. When by nocturnal radiation the temperature of bodies on or near the earth's surface becomes lower than the saturation temperature of the atmosphere surrounding such bodies, a condensation of portion of the aqueous vapor contained in the atmosphere in close proximity to such bodies takes place, aqueous particles being formed and deposited upon such bodies. Bodies of equal surface which are good heat radiators, and which consequently cool quickly, condense more dew than similar bodies which cool slowly,—that is bodies which are poor heat radiators.

When gases or liquids carrying particles of matter in suspension are subjected to an electric field, a deposition of such particles takes place. In an alternating electric field agglomeration of said particles into larger aggregates occurs; in a uni-directional electric field deposition of such particles takes place on the pole on which said field converges.

The present invention consists in means and apparatus for depositing aqueous particles from the atmosphere, and collecting the same in a catchment which functions also as a rain and dew collector.

There may be used in association with this invention other processes and apparatus whereby deposition of aqueous particles contained in the atmosphere is effected.

In the accompanying diagrammatic drawings:

Fig. 3 is a side elevation corresponding with Fig. 2;

Fig. 4 is a detail showing a cross section of a wooden plank or slat, illustrating the method of grooving it. The catchment surfaces may be constructed of such wooden planks or slats.

Fig. 5 is a fragment transverse section showing the catchment flume and portions of the catchment surfaces by which said flume is flanked; and Fig. 6 is a top plan corresponding with Fig. 5;

Figure 1:
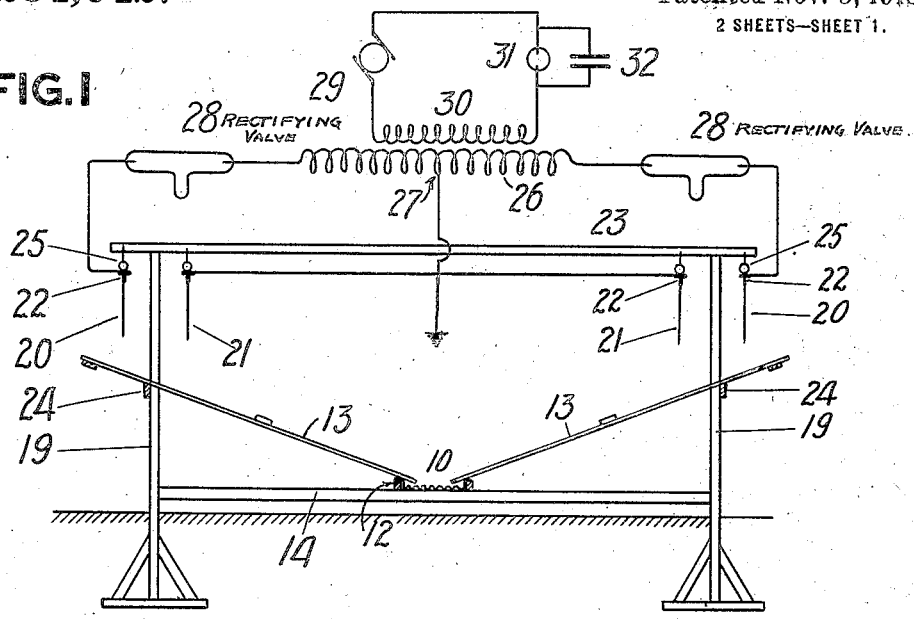
Figure 1 represents a transverse section of the catchment with the electrical apparatus fitted thereto whereby deposit of aqueous particles is effected.

The catchment consists essentially of a trough like structure which may be of any length. In practice the length is governed by the maximum volume of water to be collected, the contour of the land, and local meteorological considerations. In a zone of normal low natural rainfall a length of several miles may be used, the width over-all of the catchment being preferably upward of 20 feet. The cost of erecting and maintaining a catchment system according to this invention precludes its use except under special circumstances as for instance in arid zones where invariably the porosity and mineral conditions of the soil unfits it as a natural catchment, particularly for potable water. Cost considerations prohibit the use of the system for the sole purpose of collecting water particles except in mountainous or other regions where cloudy foggy or misty conditions are frequent.

The catchment flume 10 is constructed most economically of galvanized corrugated iron sheets laid on bearers 11 at intervals, on a fall of 1 in 400, which is sufficient to insure free flow of collected water. The ends of contiguous sheets are overlapped and soldered to prevent leakage. The corrugated bottom of the flume operates to limit the exposed surface area of water and so to minimize reëvaporation losses. The bearers 11 are preferably framed to longitudinals 12 which are erected along either side of the flume. The longitudinals 12 are supported by the transoms 14 framed to the standards 19 and are also used to support the lower ends of the catchment planks or slats 13 which constitute the catchment surfaces. The overhead transoms 23 carry the electrical lines and parts hereinafter particularized at a height of 8 feet or thereabout above the catchment surfaces. The catchment surfaces are inclined at an angle approximately 20° to the horizontal. They are constructed of planks or slats of wood or other suitable material having high heat radiating capacity. These planks or slats 13 are set side by side on longitudinals 12 and 24 supported by the standards 19 at appropriate intervals, and when of absorbent material as wood they are treated with a paint or varnish or dressing to render them non-absorbent and, as far as may be, smooth on both surfaces.

Figure 2:
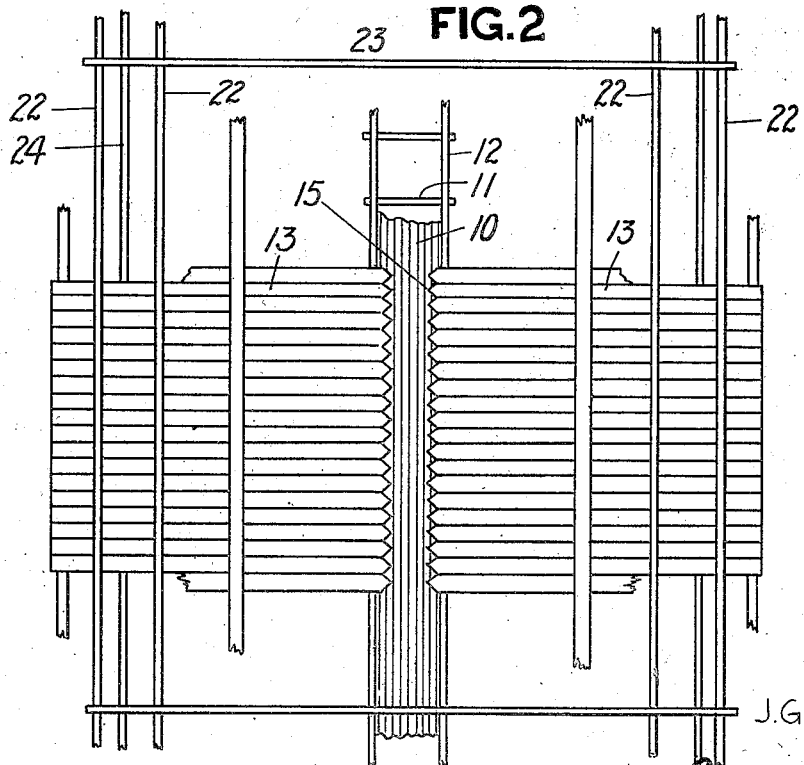
Fig. 2 is a corresponding top plan of a broken length of said catchment, omitting said electrical apparatus.

When the planks or slats 13 are of wood, they are V-grooved centrally on the upper surface and along the quarters on the under surface as shown in section in Fig. 4. Warping due to weathering then results in upward bending of the planks or slats at each edge so that they take the section of a shallow V-gutter. The inner ends of the planks or slats 13 oversailing the flume 10 are mitered so that the water runs to the salient points 15 (see Figs. 2 and 6). This mitering of the discharging end of each plank or slat has the result that the collected water is brought to a central dropping point and is not distributed over broad edges where it would be retained and subsequently lost by evaporation. When flat sheets of a non-warping material are used they are set at the same angle of incline as already described, and if of less length than the width of the catchment surfaces they are placed in rows with the lower edges oversailing the upper edges of the sheets below. The lower edge of each sheet is mitered as shown at 15 in Fig. 6. The whole structure has been devised to promote the gathering together of the collected water into common channels and as far as practicable to inhibit the spreading of same over surfaces.

To insure carrying capacity in the flume 10 particularly in the lower levels through which water from the higher levels passes, the edges 16 of the sheets 17 are bent upwardly and lapped on the longitudinals 12 whereby the flume is enabled to take care of a flow of water several inches deep.

The inner ends of the planks or slats 13 are supported on washers 18 above the longitudinals 12 so that the continuity of the under surfaces is not substantially interrupted, a clearance space being allowed between said washers 18. Water collected as dew on the under surfaces of the planks or slats runs by gravity along said surfaces and is deposited from the salient points 15 at the ends thereof into the flume 10.

The electrical apparatus comprises a system of wires 20—21 pendent from continuous conductors 22 supported by insulators 25 on the transoms 23 said pendent wires 20—21 overhanging the catchment surfaces from about 8 feet more or less above said surfaces. It includes also appropriate connections to generating apparatus supplying unidirectional electrical energy to said conductors and pendent wires, at a potential of the order of 100,000 volts. This pressure is subdivided in the following described manner. The pendent wires 20 and 21 are arranged in two parallel rows over either catchment surface and near the higher ends of same, and the inner rows of wires at either side are electrically connected to ground, and thus electrically together. The transformer secondary 26 is electrically connected from a middle point 27 to ground, and therefore to said inner rows 21 of pendent wires. The flume 10 is electrically connected to ground. The flume 10 and the inner pendent wires 21 are therefore at earth potential.

The outer ends of the transformer secondary 26 are connected through rectifying valves 28 to the outer pendent wires 20. A voltage of the order of 50,000 volts therefore exists between the outer (20) and the inner (21) pendent wires on either flank of the catchment. The primary energizing circuit consists of a source of electrical energy 29, a primary transformer coil 30, an interrupter 31, and a condenser 32 in a shunt around said interrupter 31.

The pendent wires in each row are set about one-and-a-half inches apart, and each inner (21) and outer (20) row is set about two feet apart. Four parallel rows of wires thus form the open terminals of the energizing circuit, and an electric field is thus established between the inner and outer rows of wires above either flank of the catchment.

The pendent wires used in practice are No. 10 B. W. G. of galvanized iron, with lower ends pointed, to facilitate dropping off of collected aqueous particles and dew, and the conductors may be of L- or T-iron proportioned to the weight of the attached pendent wires which they carry between supports; or they may be of a heavy section wire.

In operation, the system can function as a dew collector only during the hours of night and early morning. For rain collection and deposition of aqueous particles from atmosphere it can function at any hour. In respect of rain the structure forms an efficient mechanical catchment which obviates leakage and soakage losses and shows in practice for this purpose an efficiency of 95% or thereabouts of measured vertical rainfall. In the case of driving rain, it shows a super-efficiency of 110% due to the fact that in addition to the quantity of rain directly caught on the catchment flanks and flume a further quantity is caught by the pendent wires, and drops therefrom onto the catchment surfaces below.

In functioning as a dew collector under suitable meteorological conditions as before explained, the extensive area of the catchment, the material of which same is constituted as already described being of high heat radiating capacity, promotes the condensation of a very considerable mass of water in minute globules on its upper and lower surfaces.

As a consequence of absorption by these minute globules of water of the heat radiated from the catchment surfaces, their temperature would, if they were allowed to remain on the catchment surfaces become substantially identical with the temperature of the aqueous vapor in the air in close proximity to said surfaces. Further condensation would in such case cease. It is therefore necessary to rid the catchment surfaces of these minute globules as rapidly as possible. The drops of dew deposited from the pendent wires start the water globules on the catchment surface running, and said surfaces are thereby freed of these water globules, and further condensation may then take place. A flatter angle of recline of the catchment faces than would otherwise be necessary is thus made practicable and consequently increased efficiency of the catchment both for dew and rain collection is obtained. When the apparatus functions as a dew collector only, an electrical field is not used.

The limiting angle of recline of the catchment surfaces is that angle at which dew deposited on the under surface will run into the flume and not drop directly on to the ground.

In functioning as an aqueous particle collector, the pendent wires are energized so that a powerful uni-directional electric field is established between the inner (21) and the outer (20) rows of wires. Water particles are deposited on the wires on which said fields converge. In the apparatus shown in the drawings the fields converge from the wires in the outer rows 20 upon the wires in the inner rows 21.

As deposition of aqueous particles from the atmosphere is effected rapidly in an electric field, the quantity of water deposited is a maximum when the atmosphere in the electric field is continuously renewed by its progressive movement as in a light breeze. Conversely, excessive turbulence of atmosphere tends to minimize the result.

What I claim as my invention and desire to secure by Letters Patent is:—

1. A process for depositing aqueous particles from the atmosphere in proximity to the earth, consisting in maintaining a uni-directional electric field between a multiplicity of smooth elements pendent from substantially parallel conductors which are supported at a low elevation above the earth's surface.

2. Means for obtaining water by depositing aqueous particles from atmosphere in proximity to the earth's surface, consisting in supporting substantially parallel electrical conductors above and approximately parallel with the earth's surface, fitting said conductors with a multiplicity of pendent smooth surfaced straight wires, connecting said conductors to a source of supply of uni-directional high tension electrical energy thereby to maintain an electrical field between said pendent wires, and providing between said pendent wires and the earth's surface inclined catchment surfaces directed into a collecting vessel.

3. Means for collecting dew and rain, consisting in erecting a smooth non-absorbent inclined surface in close proximity to the ground, angularly directed toward a water collecting vessel, and associating therewith, pendent surfaces supported above the high part of said smooth non absorbent inclined surface, so that dew dropping from said pendent surfaces operates to start a flow of dew condensed on said smooth non-absorbent inclined surface toward said collecting vessel.

4. Apparatus for collecting rain and dew, comprising supports having a multiplicity of smooth wires pendent therefrom above the high parts of a catchment supported above and near the earth's surface, and consisting of two parallel inclined smooth non-absorbent surfaces constructed of material having high heat radiating capacity, and directed midway into a vessel which is adapted to collect the water deposited from the upper and under surfaces of said catchment.

5. Apparatus for collecting dew, comprising a vessel adapted to receive collected water, angularly disposed catchments supported above and near the earth's surface, constructed of material having high heat radiating qualities and smooth and non-absorbent on their upper and under surfaces, said catchments being located above and directed into said vessel and adapted to deposit dew collected on their upper and under surfaces into said vessel.

6. Apparatus for collecting naturally deposited rain and dew and for depositing aqueous particles from the atmosphere in proximity to the earth, comprising a system of smooth inclined non-absorbent surfaces of high heat radiating capacity supported above and near the earth's surface and directed into a collecting vessel, and adapted to deposit dew condensed on its under surface, and dew, rain, and aqueous particles deposited on its upper surfaces into said collecting vessel, a system of electrical conductors having a multiplicity of smooth wires pendent therefrom positioned above the upper part of said inclined surfaces, and electrical connections from said conductors to a source of unidirectional high tension electrical energy, substantially as herein described.

In testimony whereof I have signed my name to this specification in the presence of two subscribing witnesses.

JOHN GRAEME BALSILLIE.

Witnesses:
W. I. DAVIS,
H. C. CAMPBELL,